(12) United States Patent
Navarrini et al.

(10) Patent No.: US 7,704,639 B2
(45) Date of Patent: Apr. 27, 2010

(54) PROCESS FOR PREPARING IONOMERIC MEMBRANES

(75) Inventors: Walter Navarrini, Milan (IT); Stefania Panero, Rome (IT); Bruno Scrosati, Rome (IT); Aldo Sanguineti, Milan (IT)

(73) Assignee: Solvay Solexis S.p.A., Milan (IT)

( * ) Notice: Subject to any disclaimer, the term of this patent is extended or adjusted under 35 U.S.C. 154(b) by 183 days.

(21) Appl. No.: 10/423,027

(22) Filed: Apr. 25, 2003

(65) Prior Publication Data

US 2003/0215719 A1   Nov. 20, 2003

(30) Foreign Application Priority Data

Apr. 26, 2002   (IT) .................. MI2002A000902

(51) Int. Cl.
  *H01M 6/16*   (2006.01)
  *H01M 6/14*   (2006.01)
  *H01G 9/022*   (2006.01)

(52) U.S. Cl. .................. 429/189; 429/303; 429/309; 429/322; 252/62.2

(58) Field of Classification Search .................. 526/243, 526/247, 253, 255, 287; 521/25–28, 31
  See application file for complete search history.

(56) References Cited

U.S. PATENT DOCUMENTS

| | | | |
|---|---|---|---|
| 2,515,628 A | 7/1950 | Castle | |
| 2,520,388 A | 8/1950 | Earl | |
| 4,766,190 A | 8/1988 | Morita et al. | |
| 4,864,006 A | 9/1989 | Giannetti et al. | |
| 5,182,342 A | 1/1993 | Feiring et al. | |
| 5,296,318 A | 3/1994 | Gozdz et al. | |
| 5,418,091 A | 5/1995 | Gozdz et al. | |
| 5,456,000 A | 10/1995 | Gozdz et al. | |
| 6,007,935 A * | 12/1999 | Gauthier et al. | 429/66 |
| 6,033,804 A * | 3/2000 | Doyle et al. | 429/212 |
| 6,096,234 A * | 8/2000 | Nakanishi et al. | 252/62.2 |
| 6,660,828 B2 * | 12/2003 | Thomas et al. | 528/402 |

FOREIGN PATENT DOCUMENTS

| | | |
|---|---|---|
| EP | 1 172 382 A2 | 6/2001 |
| EP | 1 238 988 A1 | 2/2002 |

OTHER PUBLICATIONS

International Publication No. WO 00/24709, published May 4, 2000.
International Publication No. WO 01/03230 A1, published Jan. 11, 2001.
Doyle, et al., World Intellectual Property Organization, PCT, WO 98/20573, Int'l Filing Date: Oct. 31, 1997.
Doyle, et al., World Intellectual Property Organization, PCT, WO 99/41292, Int'l. Filing Date: Feb. 10, 1999.
Farnham, et al. World Intellectual Property Organization, PCT, WO 00/24709, Int'l. Filing Date: Oct. 26, 1999.
Cisar, et al., World Intellectual Property Organization, PCT, WO 00/63998, Int'l. Filing Date: Apr. 20, 1999.
Doyle, et al., World Intellectual Property Organization (Int'l. Bureau), PCT, WO 01/03230, Int'l. Filing Date: Jun. 28, 2000.
Tarascon, et al., Invited Paper "Performance of Bellcore's Plastic Rechargeable Li-ion Batteries," Solid State Ionics 86-88 (1996) 49-54.

* cited by examiner

*Primary Examiner*—Keith Walker
(74) *Attorney, Agent, or Firm*—Arent Fox LLP

(57) ABSTRACT

A process for preparing membranes formed by (per) fluorinated ionomeric electrolytes salified with the lithium ion, comprising the following steps:
  a) obtaining of (per) fluorinated polymer membranes, containing —$SO_2F$ groups;
  b) partial or complete salification of (per)fluorinated polymer membranes containing —$SO_2F$ groups with basic lithium compounds and final washing with water;
  c) swelling and contemporaneous drying process of membranes by dipping in a heterogeneous biphasic system of a dipolar aprotic solvent wherein insoluble solid drying agents are dispersed.

27 Claims, No Drawings

PROCESS FOR PREPARING IONOMERIC MEMBRANES

The present invention relates to a process for preparing membranes formed by (per)fluorinated ionomeric electrolyte polymers characterized by improved conductivity, and the membranes obtainable by said process to be used in rechargeable lithium batteries.

More specifically the invention relates to a process for preparing membranes formed by (per)fluorinated ionomeric polymers.

It is known in the prior art the use, under the form of film compositions, of electrolyte polymers to form the separatory membrane of a cell of a rechargeable battery. A separatory membrane constituted by said electrolyte polymers, comprises a polymeric matrix which is ionically conductive due to the incorporation therein of an organic solution of a dissociable lithium salt which supplies the ionic mobility.

A polymeric matrix suitable to the use in a cell of a rechargeable battery should have, besides a high conductivity, the following properties:

commercially available at a low cost, electrochemically stable within a wide potential range, high melting temperature, capability to absorb a high amount of liquid electrolyte to guarantee high ionic conductivity, easy workability.

For this purpose electrolyte polymers based on polyethylenoxide (PEO) wherein the crystalline polymer is swollen by the electrolyte solution, have been developed. The films obtained from said electrolyte polymer have good conductivity but poor electrochemical stability.

An alternative kind of electrolyte polymer has been suggested in U.S. Pat. No. 5,296,318, wherein copolymers based on vinylidene fluoride (VDF) are used to prepare polymeric membranes of rechargeable lithium batteries. In particular in the above patent copolymers are described containing VDF in an amount comprised between 75% and 92% by weight, and hexafluoropropene (HFP) in an amount comprised between 8% and 25% by weight. Said copolymers allow the preparation of polymeric electrolytes formed by the copolymer itself and a solvent, for example a mixture of ethylencarbonate/propylencarbonate (EC/PC), containing a lithium salt. The polymeric membrane of said composition can be obtained by casting, dissolving the swollen polymer with a mixture of ethylcarbonate and propylencarbonate in which the lithium salt is dissolved, in a solvent, for example tetrahydrofuran (THF). Then the solution coating on a substratum takes place and the solvent (THF) is evaporated. In this way a stable polymeric film of about 100 μm having ionic conductivity in the range $10^{-4}$–$10^{-3}$ S/cm$^{-1}$, is obtained.

In U.S. Pat. No. 5,418,091 and U.S. Pat. No. 5,456,000 a method for preparing polymeric membranes always containing a VDF copolymer with HFP, and a method for preparing the battery itself, are described. In particular the polymeric membranes are prepared by an extraction/activation process whereby a suitable plasticizer is added to the polymer in an amount comprised between 20% and 70% by weight. In this step the electrolyte polymer results in a non-activated and the storage is possible of the battery components which use the electrolyte polymer. In a non-activated form it contains said plasticizer, for example dibutylphthalate, and the activation takes place by the plasticizer extraction from the polymer and its substitution with the electrolyte solution formed by the EC/PC mixture containing the lithium salt.

The films obtained from the electrolyte polymer compositions described in said patents have a limited retention of the high boiling solvent containing the lithium salt and therefore a reduced ionic conductivity.

In the mentioned patents the assembly of the whole battery is also described by applying the extraction/activation process also in the preparation of the anode and of the cathode. The two electrodes are obtained by depositing, for example by casting, the polymer containing the plasticizer on the metal substrata. The separator is then placed between the two electrodes and successively the polymeric films present on all the battery components are subjected to a melting process, such for example the coextrusion, which favours the adhesion between the separator and the electrodes. The battery is then activated by the plasticizer substitution with the electrolyte solution containing the lithium salt. An example of preparation of said batteries according to the above patents is described by J. M. Tarascon et al. in "Solid State Ionic" 86-88 (1996) pages 49-54.

The electrolyte polymer is therefore a system formed by the polymer, solvents and/or plasticizers, such ethylencarbonate, propylencarbonate, etc. and by lithium salts, as $LiSO_3CF_3$, $LiN(SO_2CF_3)_2$, $LiPF_6$, etc.

The drawback shown by the electrolyte polymers VDF and HFP based onf the prior art is that they have not a high ionic conductivity; furthermore, they do not show a suitable thermal stability.

More particularly rechargeable lithium batteries can be divided in two classes, those using respectively a liquid electrolyte or a polymeric electrolyte.

Liquid electrolytes have the advantage to show a high conductivity. Batteries using liquid electrolytes, differently from those using solid electrolytes, need a porous separator between the electrodes, but can be subjected to electrolyte losses. This represents a drawback which can compromise the battery functioning.

Ionomeric polymeric electrolytes are also known which, compared to liquid electrolytes, have the advantage that the conductivity is due only to the lithium ion. Therefore in the batteries with polymeric electrolyte the polarization and oxidation phenomena, typical of batteries with liquid electrolyte, are reduced.

Ionomeric electrolytes can be obtained with a very reduced thickness so as to obviate the drawback of the lower conductivity.

It is known that during the lithium battery preparation the water must be removed from the electrolyte and from all the internal battery components, whereby the various battery parts must be prepared and assembled in anhydrous environment. It is known that the water presence in the electrolyte or in the electrodes forming the lithium battery can produce an increase of the ionic conductivity. However the water present during the battery charging can develop by electrolysis gases which increase the internal pressure so compromising the correct battery functioning. Depending on the residual water amount, pressure values such to cause structural failures can also be reached. Therefore it is important to minimize the water traces.

Patent application WO 00/63,998 describes perfluorinated ionomeric solid electrolytes for lithium batteries and the method for obtaining them. According to the process of said patent the ionomeric electrolyte is initially converted under the form of lithium salt and subsequently dried under vacuum. Then the swelling with a mixture of solvents follows comprising both the ion carrier solvent (plasticizer), such for example organic carbonates or even partially fluorinated ethers, for example $CH_3OC_4F_9$, and a volatile co-solvent having a high impregnation capability, for example methanol, ethanol, THF. From the examples of said patent application it results that the membrane drying step is carried out under vacuum at 110° C. for one night, and that some days are necessary to carry out with the carrier solvent the membrane impregnation until obtaining the maximum swelling (60-110% of increase by weight with respect to the initial swelling). By drying an ionomeric membrane under vacuum at 110° C., even for a higher time than that reported in the examples of said patent application, high values of residual water and low conductivities are obtained (see comparative Examples).

As said, the presence of water in the lithium battery electrolyte negatively affects the battery functioning.

Patent application WO 98/20,573 describes ionomeric perfluorinated ionomers salified in the lithium form and the method to obtain them. According to the process of said patent application the ionomeric polymers in the $SO_2F$ form are salified with aqueous LiOH in admixture with DMSO, or other organic solvents, then washed with distilled water and dried by hot treatment under vacuum for a period from 24 to 98 hours. Alternatively anhydrification can be hot carried out under anhydrous nitrogen flow. Subsequently a swelling step with aprotic solvents is carried out. According to said patent application conductivity values of the polymeric electrolytes higher than $10^{-4}$ S/cm are obtained when two selling steps are carried out, using two different anhydrous solvents, or mixtures of anhydrous solvents, for each swelling step. The duration of each single swelling step ranges from 24 hours to two weeks and in the first step also a protic solvent, for example methanol, can be used. The use of a protic solvent implies that its successive removal must be as complete as possible, since in the patent application it is stated that the protic solvent in traces in the polymer can compromise the duration and the efficiency of the lithium battery. With the methods used in this patent application to dry the membrane there are substantially the same drawbacks, as regards the residual water amount in the polymeric electrolyte, of the method of the above patent application WO 00/63,998. Besides, the membranes do not show a high conductivity if two swelling solvents are not used (see comparative Examples).

Patent application WO 00/41,292 describes fluorinated ionomers obtained by using VDF as comonomer. The membrane preparation comprises: a) the VDF polymerization with the sulphonic monomer and the subsequent salification, carried out by using a mixture of alkaline metal carbonates and methanol, optionally containing dimethylcarbonate, b) filtration and obtaining of the membrane by casting. The membrane dehydration is carried out for example by heating under vacuum, then the swelling is carried out with preferably aprotic solvents. The ionomeric membrane conductivity according to the Examples of said patent application is of the order of $10^{-4}$ S/cm. The process of said patent has the drawback to use, as salification solvent, methanol, whose presence even in traces in the ionomeric polymer, as said in WO 98/20,573, can compromise the duration and the efficiency of the lithium battery. Higher conductivity values are obtained when water is used as swelling solvent. However; as above said, the water must be removed by the drying process. Therefore this conductivity value is not significant.

The patent application WO 01/03,230 describes sulphonic ionomeric electrolytic compositions, based on vinylidene fluoride, wherein dimethyl succinate is used as solvent or co-solvent. In the examples a process to prepare an ionomeric membrane is described wherein the ionomeric polymer, obtained in the form of powder, is salified by treatment with a mixture of lithium carbonate in methanol. Successively both the residual water and the methanol are removed from the powder by azeotropic distillation with toluene. The ionomeric polymer is recovered by filtration and dried under vacuum. In anhydrous environment, to the powder, the calculated amount of ethylene carbonate to obtain the polymer swelling is added. The membrane is obtained by pressure moluding of the swollen polymer.

Said process has the drawback to comprise numerous steps. Besides, in the salification step methanol is used. This leads to the above drawbacks. To eliminate said solvent the azeotropic distillation with toluene is carried out, thus introducing a further step.

Patent application WO 00/24,709 describes the preparation of (per)fluorinated sulphonic ionomers, obtained from the TFE or VDF copolymerization with a not vinylether sulphonic perfluoroolefin. The ionomeric membranes are obtained by treating the polymers according to various processes. For example, the polymers are salified in a mixture of aqueous lithium carbonate/methanol and then moulded in films, dried under heating and subsequently swollen in ethylene carbonate. The process described in this patent application substantially shows the same above drawbacks of the prior art processes.

The need was felt to have available a process for the preparation of an ionomeric electrolyte to be used in lithium batteries, simplified with respect to those described in the prior art and which in particular did not use methanol, to avoid the above drawbacks, and being such to allow the obtaining of substantially anhydrous ionomeric electrolytes, to avoid the inconveniences due to the water presence, and having furthermore an improved conductivity.

The Applicant has surprisingly and unexpectedly found a process which solves the above technical problem.

An object of the present invention is a process to prepare membranes formed by (per)fluorinated ionomeric electrolytes salified with the lithium ion, comprising the following steps:

a) obtaining of (per)fluorinated polymer membranes, containing —$SO_2F$ groups pendent with respect to the main chain;

b) partial or complete salification of the (per)fluorinated polymer membranes containing —$SO_2F$ groups with basic lithium compounds and final water washing;

c) swelling and contemporaneous drying of the membranes by dipping in a heterogeneous biphasic system formed by a solvent or a mixture of dipolar aprotic solvents wherein solid drying agents insoluble in the organic solvent and inert towards the solvent and the membranes, are dispersed.

The invention process can be carried out in discontinuous or in continuous.

Step c) can optionally be repeated when the process is in continuous.

The step a) membranes are generally obtained by moulding, or extrusion or film casting.

The polymers used to prepare the ionomeric membranes of the present invention are (per)fluorinated polymers containing $SO_2F$ groups. Said polymers are copolymers of a fluoroolefin containing a fluorosulphonic group, having formula:

$$CF_2=CF-(OCF_2CFR)_aO-CF_2CFR'SO_2F \qquad (I)$$

wherein

R and R' are independently: F, Cl, $C_1$-$C_3$ perfluoroalkyl;

a is zero or 1;

with one or more fluorinated olefinic comonomers and optionally also with non fluorinated olefinic comonomers.

Preferably the formula (I) fluoroolefin is the vinylether of formula $CF_2=CFOCF_2CF_2SO_2F$.

Among the fluorinated olefinic comonomers the following are mentioned:

- $C_2$-$C_8$ (per)fluoroolefins, as tetrafluoroethylene (TFE), hexafluoropropene (HFP), hexafluoroisobutene;
- $C_2$-$C_8$ hydrogenated fluorooelfins, as vinyl fluoride (VF), vinylidene fluoride (VDF), trifluoroethylene, $CH_2=CH-R_f$ perfluoroalkylethylene, wherein $R_f$ is a $C_1$-$C_6$ perfluoroalkyl;
- $C_2$-$C_8$ chloro- and/or bromo- and/or iodo-fluoroolefins, as chlorotrifluoroethylene (CTFE) and bromotrifluoroethylene;
- $CF_2=CFOR_f$ (per) fluoroalkylvinylethers (PAVE), wherein $R_f$ is a $C_1$-$C_6$ (per)fluoroalkyl, for example trifluoromethyl, bromodifluoromethyl or heptafluoropropyl;
- $CF_2=CFOX$ (per)fluoro-oxyalkylvinylethers, wherein X is: a $C_1$-$C_{12}$ alkyl, or a $C_1$-$C_{12}$ oxyalkyl, or a $C_1$-$C_{12}$ (per)fluoro-oxyalkyl having one or more ether groups, for example perfluoro-2-propoxy-propyl.

Optional olefinic comonomers which can be copolymerized are $C_2$-$C_8$ non fluorinated olefins as ethylene, propylene.

A process for the preparation of fluorinated polymers can be carried out by aqueous emulsion polymerization according to well known methods of the prior art, in the presence of a suitable radical initiator. This can be selected for example from the following: inorganic peroxides (for example alkaline metal or ammonium persulphates, perphosphates, perborates or percarbonates), optionally in combination with ferrous, cupreous or silver salts or of other easily oxidizable metals; organic peroxides (for example disuccinylperoxide, terbutylhydroperoxide, diterbutylperoxide); azocompounds (see U.S. Pat. No. 2,515,628 and U.S. Pat. No. 2,520,338, herein incorporated by reference). It is also possible to use organic or inorganic redox systems, as ammonium persulphate/sodium sulphite, hydrogen peroxide/aminoiminomethan-sulphinic acid. The used initiators can be selected also from those described in the European patent application 02004181.0.

In the reaction medium surfactants of various type can also be present, among which the fluorinated surfactants of formula:

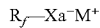

are particularly preferred, wherein $R_f$ is a $C_5$-$C_{16}$ (per)fluoroalkyl chain or a (per)fluoropolyoxyalkyl chain, $Xa^-$ is $-COO^-$ or $-SO_3^-$, $M^+$ is selected among $H^+$, $NH_4^+$ or an alkaline metal ion. Among the most commonly used surfactants, we remember: ammonium perfluorooctanoate, (per)fluoropolyoxyalkylenes ended with one or more carboxylic groups, etc.

During the polymerization chain transfer agents can be added, such for example those described in U.S. Pat. No. 4,766,190, herein incorporated by reference.

In particular the process in emulsion is carried out in the presence of a microemulsion, as described in EP 1,172,382, herein incorporated by reference.

The process for the preparation of the fluorinated polymers according to the present invention can be carried out also by polymerization in organic solvent as described in U.S. Pat. No. 4,864,006 and U.S. Pat. No. 5,182,342, herein incorporated by reference. The organic solvent is selected from the group comprising chlorofluoro-carbons, perfluoropolyethers, hydrofluorocarbons and hydrofluoroethers.

As said, the polymers used to prepare the ionomeric membranes according to the present invention process are copolymers containing a fluoroolefin of formula (I) in an amount in per cent by moles, lower than or equal to 50% by moles, more preferably lower than or equal to 30% by moles.

The preferred polymers are TFE copolymers with the sulphonic fluoroolefin of formula (I).

The (per)fluorinated polymers of the present invention membranes generally have equivalent weight in the range 380-1,600 preferably 550-1,200.

In step a) the sulphonic polymers are under the form of membranes having thickness of 0.05-1 millimeter, preferably 0.1-0.3 millimeters. The membranes can be obtained by moulding. Alternatively they can be obtained by polymer extrusion, or by film casting of a sulphonic polymer solution in perfluorinated solvents, such for example $C_5$-$C_{10}$ perfluoroalkanes and perfluoropolyethers.

In step b) the salification step is carried out at temperatures from 50° C. to 100° C., preferably from 70° C. to 90° C., transforming the above polymers in the lithium form ($-SO_3Li$) using for example aqueous LiOH or alkaline inorganic lithium salts as lithium carbonate or bicarbonate. The conversion of the $-SO_2F$ groups into $-SO_3Li$ is followed by infrared spectrophotometry by monitoring the decrease, or thr disappearance, of the peak corresponding to the group ($-SO_2F$) (1470 cm$^{-1}$).

In step b) the ionomeric polymers forming the membranes are completely or partially salified with lithium ions, preferably they are completely salified.

The final washing with water in step b) is carried out at temperatures from 20° C. to 80° C., preferably from 20° C. to 50° C., until neutral reaction of the washing waters.

Step c) is preferably carried out under the following conditions:

- environment having controlled humidity, lower than 5, preferably lower than 0.1%, still more preferably lower than 0.001%;
- the solvent used for the swelling/drying steps is selected from the group of dipolar aprotic organic solvents, preferably selected from the lithium batterie service organic solvents, such for example organic carbonates, preferably ethylene carbonate, propylene carbonate or mixtures thereof;
- the temperature is from 20° C. to 70° C., preferably from 20° C. to 50° C.

The step c) duration is generally from 2 to 24 hours, preferably from 4 to 12 hours, and is completed when the swelling, and the residual water amount in the membrane, satisfy the conditions indicated hereinafter:

- the membrane swelling, in per cent by weight increase with respect to the sample of the non-swollen membrane, treated under vacuum at 130° C. at 10$^{-3}$ mbar (10$^2$ Pa) for 8 hours, is higher than 150%, and can reach even values of about 210% when the membrane is formed by a perfluorinated ionomer having equivalent weight 750 formed by TFE and the comonomer having formula:

- the skilled man in the field can easily determine the swelling value for the invention ionomers once the equivalent weight has been fixed;
- the residual water amount, determined by Karl Fischer equipment, is lower than 400 ppm, preferably from about 30 ppm to about 300 ppm.

The drying agents used in step c) are insoluble in the used solvent and are selected from the inorganic salts capable to absorb hydration water, for example sodium sulphate, alkaline metal oxides and hydroxides, alkaline-earth oxides and hydroxides, preferably the water sequestrant as the molecular sieves, still more preferably molecular sieves having 3 Å sizes.

The skilled man in the field is capable to determine the ratio between the amount by weight of anhydrifying agents to be used with respect to the membrane weight.

Step c) can be repeated when the process is carried out in discontinuous to obtain very reduced values of residual water. To obtain extremely low water contents, it is possible to operate with a two or more steps process substituting, after some hours, both the solvent and the drying agent with fresh solvent and drying agent. After the first substitution of the solvent and drying agent contents lower than 50 ppm are obtained. These results can be more easily obtained by a continuous process.

The heterogeneous biphasic system components used in step c) can be separately regenerated using conventional processes.

A further object of the present invention is constituted by swollen membranes, obtainable according to the present invention process, formed by the ionomeric polymers as above, said membranes having the following properties:

swelling higher than 150%, and it can reach even values of about 210%, when determined under the following conditions:
  specimen: membrane consisting of a perfluorinated ionomer having an equivalent weight of 750, formed by TFE and the monomer having the formula:

$CF_2\!=\!CFOCF_2CF_2SO_2F$;

the per cent increase by weight due to the membrane swelling is calculated referred to the specimen of the same membrane treated under vacuum at 130° C. at $10^{-3}$ mbar ($10^2$ Pa) for 8 hours, before swelling;
  the skilled man in the field can easily determine the swelling value for the invention ionomers once the equivalent weight has been fixed;
residual water, determined by Karl Fischer equipment, lower than 400 ppm, preferably from about 30 to about 300 ppm;
specific conductivity: higher than $10^{-4}$ S/cm, preferably higher than $3.10^{-4}$ S/cm.

The present invention process has the advantage to contemporaneously carry out the membrane drying and swelling. In particular in the drying step c), as above said, the content in residual water is reduced by a very simple method. Besides, the simultaneous swelling is high and takes place in short times, also in absence of protic solvents as methanol. It has been found by the Applicant that the combination of said two steps is advantageous since the process duration is reduced compared with the duration of those of the prior art and surprisingly membranes having higher conductivities and a lower content in residual water are obtained with respect to the membranes dried by dry heating under vacuum or under anhydrous gas flow, as described in the prior art.

The conductivity values of the membranes obtained with the present application process are high, of the order of $10^{-4}$ S/cm or higher, even in the presence of a sole swelling solvent. According to the present invention process it is therefore possible to avoid the use of active hydrogen containing cosolvents with respect to lithium (ex. methanol, N-methyl-formamide). The conductivity values can reach values of the order of $10^{-3}$ S/cm.

Furthermore the drying according to the present invention process takes place at temperatures lower than those of the prior art and in this step a service solvent of the battery is used or a mixture of said solvents. This represents an advantage since the membranes prepared by the present invention process are directly usable in lithium batteries.

Further advantages of the present invention process are the following:
  the membrane morphology obtained in aqueous medium, after salification, is not altered during the drying/swelling treatment under the conditions described for step c) of the process;
  it is possible to obtain an ionomeric membrane having high conductivity also carrying out only once the drying/swelling step, also avoiding the use of protic solvents as for example methanol. The Applicant has shown that the ionomeric membranes obtained with the teachings of the prior art, besides showing a low swelling in the solvents used in lithium batteries, show a very low conductivity and are fragile. See comparative Examples;
  in the lithium battery preparation (electrodes+polymeric electrolyte) in the various preparation and assembly steps, one can operate in the presence of water, performing the final drying/swelling step as described in step c) of the process according to the present invention.

A further advantage of the process according to the present invention is that most of the process steps are not carried out under anhydrous conditions, therefore its carrying out on the industrial scale results extremely simplified.

Lithium batteries comprising the membranes prepared with the present invention process can be prepared by assembling in anhydrous environment the active electrodes, previously dried, with the membranes swollen in the working solvent or mixture of solvents (plasticizer), obtained as above described.

The following Examples illustrate the invention without limiting the scope thereof.

EXAMPLES

The analaytical determiantions mentioned hereinafter are carried out by using a dry box under nitrogen atmosphere.

Specific Conductivity Determination

The conductivity determination has been carried out by the electrochemical impedance spectroscopy technique, by using the Solartron® 1250 instrument, in the frequency range 65 kHz-100 mHz. From the resistance value on the real axis Re, the specific conductivity σ is determined by the relation:

$$\sigma = \frac{1}{R_e A}$$

wherein l=distance between the electrodes; A=area of the electrodes; l/A represents the geometric constant of the measurement cell. The conductivity determination is carried out by using two 310 steel electrodes.

The used electrodes are circular with a diameter of 1 cm.

Membrane Swelling Value

The membrane swelling is determined by difference of weighings with respect to the initial weight.

Water Content Determination

The water content is determined by analysis with Karl Fischer equipment.

Anodic Stability Determination (Decomposition Potential) of an Ionomeric Membrane The anodic stability of the ionomeric membrane is determined by evaluating by electrochemical polarization measurements, in a cell formed by a lithium cathode, by an anode constituted by stainless steel and by the membrane interposed between the electrodes. The cell is of the type:

Li/membrane/electrode

At the cell electrodes a potential difference rising from 3.2 V to 6 V, with a scanning rate of 100 μVs$^{-1}$ is applied. Reporting in a graph in abscisses the difference of potential and in ordinates the current density in mA/cm$^2$, the decomposition potential is determined on the abscisses in correspondence with the anodic current value which significantly differs from the initial value (bottom current). For example, an increase of the anodic current between 1/10 and 1/5 with respect to the initial value is generally considered significant.

The electrodes used are circular with a diameter of 1 cm.

Example 1

TFE polymerization with $CF_2=CFOCF_2CF_2SO_2F$ perfluoro(3-oxa-4 pentene-1-sulphonylfluoride) and obtaining of an ionomeric polymer having equivalent weight 750 g/eq The following reactants are introduced into a 5 litre autoclave:

124.7 g of a microemulsion of perfluoropolyoxyalkylenes previously obtained by mixing:
49.9 g of a perfluoropolyoxyalkylene having an ammonium salified acid end group of formula:

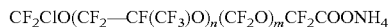
$CF_2ClO(CF_2-CF(CF_3)O)_n(CF_2O)_mCF_2COONH_4$ wherein n/m=10, having average molecular weight 527;
24.9 g of a perfluoropolyether oil Galden® D02 of formula $CF_3O(CF_2-CF(CF_3)O)_n(CF_2O)_mCF_3$, wherein n/m=20, having average molecular weight 450;
49.9 g of water;
3,000 ml of demineralized water;
137 ml of the monomer of formula $CF_2=CF-O-CF_2CF_2-SO_2F$.

Under stirring at 630 rpm, the mixture in the autoclave has been heated to 75° C. 40 ml of an aqueous solution at a concentration 15 g/l of ammonium persulphate (APS) are then fed. The pressure is brought to 12 atm ass (12.12×10$^5$ Pa) by introducing TFE. The reaction starts after 1 minute. The pressure is maintained at 12 atm ass by feeding TFE. During the polymerization an amount equal to 22.8 ml of the sulphonic monomer of formula $CF_2=CF-O-CF_2CF_2-SO_2F$ are added every 6.5 g of fed TFE. The total amount of TFE fed to the reactor is 1,000 g. The reaction is stopped after 70 minutes from the start, by decreasing the stirring, cooling the reactor and venting the TFE. The produced latex has a solid content of 32% by weight. The latex is coagulated by freezing and the obtained coagulum washed with demineralized water until neutrality of the washing waters. The polymer is then dried at 150° C.

The copolymer composition, determined by NMR, is the following: 82% by moles of TFE and 18% by moles of sulphonic monomer, corresponding to an equivalent weight of 750 g/eq.

Example 2

Membrane preparation in the $SO_2F$ form and subsequent salification in the $SO_3Li$ form.

A) Membrane Preparation

About 11 g of the copolymer obtained in Example 1, containing TFE and $CF_2=CFOCF_2CF_2SO_2F$, equivalent weight of 750 g/eq, are placed in a PTFE template (20×20 cm) having a thickness ranging from 0.2 to 0.3 mm, between two PTFE films put on two sample-holder steel plates. The template is placed in press equipped with water circulation cooling system at the temperature of 250° C. Then a first step lasting 10 minutes is carried out, formed by a preheating step (9 min 30 s) followed by degassing operations (30 s). In the second step one operates in the press at a pressure of 9.8 MPa (100 kg/cm$^2$) for 1 minute at 250° C. Successively, maintaining the same pressure, the temperature is set at 150° C. for 10 minutes; lastly the specimen is cooled to room temperature by water flowing.

B) Salification and Washing

The membrane as prepared in the pervious step A), is salified by dipping for 6 hours at the temperature of 80° C. in about 500 ml of aqueous lithium hydroxide, obtained by dissolving 40 g of LiOH.H$_2$O in 500 ml of deionized water. The so obtained membrane is washed more times with deionized water at room temperature until neutrality of the washing waters. Finally the membrane is kept in deionized water for the use. The increase by weight per cent with respect to the membrane dried under vacuum at 130° C. at 10$^{-3}$ mbar (10$^2$ Pa) for 8 hours is 60%. The analysis by infrared spectrophotometry (1470 cm$^{-1}$) shows that all the SO$_2$F groups have been converted into SO$_3$Li groups.

Example 3

Swelling by one pass in solvent and drying process of the membrane prepared in Example 2.

One rectangle (1 cm×2 cm) of the membrane prepared in Example 2 dripped and blottered with filter paper has been transferred into a 100 ml flask containing 40 ml of anhydrous propylencarbonate (PC) (battery grade), and about 5 g of molecular sieves (3 Å 4-8 mesh—Aldrich®) previously activated under vacuum at 250° C. for three hours. The flask is sealed and introduced in dry-box. The membrane is left in contact with the anhydrous PC in the presence of the molecular sieves for 5 hours. Lastly the membrane is recovered and the water content is determined, resulting to be 250 ppm. The increase by weight per cent of the membrane, calculated with respect to the hydrated membrane prepared in Example 2 is 68%. The increase by weight pet cent with respect to the membrane dried under vacuum is 168%. The so obtained swollen membrane is malleable and can be easily bent without cracks.

Example 4

Swelling by two passes in solvents and drying process of the membrane prepared in Example 2.

The procedure described in Example 3 is repeated and at the end the membrane is likewise treated, by substituting both the solvent and the molecular sieves placed in the flask. Lastly the membrane has been recovered and the water content, resulted of 33 ppm, has been determined. The membrane swelling with respect to the membrane dried under vacuum is 204% and with respect to the initial wet membrane 90%. The so obtained swollen membrane is malleable and can be easily bent without cracks appearing in the membrane.

This Example shows that by repeating the swelling and the drying process, it is possible to reduce the amount of residual water to some tens of ppm.

Example 5

Swelling and drying processn by one step in solvent of the membrane prepared in Example 2 and membrane specific conductivity determination.

From the membrane prepared in Example 2 a disk having a diameter of 1 cm is cut. The process described in Example 3 is repeated. The weight increase with respect to the membrane dried under vacuum is 160% and with respect to the initial wet membrane 63%. The specific conductivity measured at room temperature is $1\times10^{-3}$ S/cm.

This Example shows that with the membranes prepared according to the present invention process high conductivies are obtained even using in the swelling step only one aprotic solvent in absence of protic solvents.

Example 6

Swelling and drying process by two passes in solvent of the membrane prepared in Example 2 and membrane specific conductivity determination.

From the membrane prepared in Example 2 a disk having a diameter of 1 cm is cut. The process described in Example 4 is repeated. The weight increase with respect to the membrane dried under vacuum is 190% and with respect to the initial wet membrane 82%. The specific conductivity measured at room temperature is $9\times10^{-4}$ S/cm.

Example 7 (Comparative)

Membrane drying process by heating under vacuum for 64 hours at 110° C. according to the prior art.

One rectangle (1 cm×2 cm) of the membrane prepared in Example 2 is put under vacuum at $10^{-3}$ mbar ($10^2$ Pa) at 110° C. for 64 hours according to WO 98/20,573. The residual water content in the membrane specimen is 400 ppm. The membrane after the drying process becomes fragile and is easily cracked.

This Example shows that by using a drying process of the prior art the residual water content is higher than that of the process according to the present invention.

Example 8 (Comparative)

Drying process by heating under vacuum according to WO 98/20,573, membrane swelling and swelling determination at different conditioning times.

One proceeds as in Example 7 (comparative) Lastly the membrane is swollen as described in Example 3.

The percent weight increase of the membrane hot dried under vacuum at different conditioning times by dipping in PC is reported in Table 1. The so dried and swollen membrane remains fragile and can be easily cracked.

The data reported in Table 1 show that by using the processes of the prior art high swelling values are not obtained.

The specific conductivity measured after 10 days of the membrane conditioning by dipping in PC results $10^{-6}$ S/cm.

Example 9 (Comparative)

Drying process by heating in an anhydrous nitrogen circulation stove at 98° C. for 100 hours One rectangle (1 cm×2 cm) of the membrane prepared in Example 2 is put in an anhydrous nitrogen circulation stove at 98° C. for 100 hours according to WO 98/20,573. The membrane water content has resulted 610 ppm. The membrane dried with the aforesaid process results fragile and can be easily cracked.

The same comments of Example 7 (comparative) are repeated for this Example.

Example 10 (Comparative)

Drying process by heating in an anhydrous nitrogen circulation stove at 98° C. for 100 hours, subsequent membrane swelling according to Example 3 and specific conductivity determination.

The membrane drying process is carried out as described in Example 9. The subsequent swelling is carried out as in Example 3, by using the same PC amount according to the process described therein. The per cent weight increase with respect to the weight of the dehydrated membrane in nitrogen atmosphere and the respective specific conductivities at the various conditioning times in the PC solvent are reported in Table 2. The so dried and swollen membrane remains fragile and can easily be cracked.

The membrane swelling data reported in Table 2 substantially confirm those of the previous Table 1, obtained with a different drying process. The specific conductivities at the various conditioning times are very low.

Example 11

Polymerization (TFE copolymer and $CF_2=CFOCF_2CF_2SO_2F$ perfluoro(3-oxa-4 pentene-1-sulphonylfluoride), obtaining of an ionomeric polymer having equivalent weight of 880 g/eq.), molding, membrane salification and final washing wuith water The following reactants are introduced into a 22 litre autoclave:

387.5 g of a microemulsion of perfluoropolyoxyalkylenes previously obtained by mixing:
1.55 g of a perfluoropolyoxyalkylene having an acid potassium salified end group of formula:

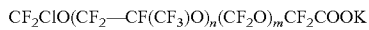

wherein n/m=10, having average molecular weight 527;
24.9 g of a perfluoropolyether oil Galden® D02 of formula $CF_3O(CF_2-CF(CF_3)O)_n(CF_2O)_mCF_3$, wherein n/m=20, having average molecular weight 450;
49.9 g of water;
14.5 litres of demineralized water;
137 ml of the monomer of formula $CF_2=CF-O-CF_2CF_2-SO_2F$.

Under stirring at 540 rpm, the mixture in the autoclave has been heated to 60° C. 150 ml of an aqueous solution at a concentration 3 g/l of potassium persulphate (KPS) are then fed. The pressure is brought to 12 atm ass ($12.12\times10^5$ Pa) by introducing TFE. The reaction starts after 1 minute. The pressure is maintained at 12 atm ass by feeding TFE. During the polymerization an amount equal to 185 g of the sulphonic monomer of formula $CF_2=CF-O-CF_2CF_2-SO_2F$ are added every 200 g of fed TFE. The total amount of TFE fed to the reactor is 4,000 g. The reaction is stopped after 490 minutes from the start, by decreasing the stirring, cooling the reactor and venting the TFE. The produced latex has a solid content of 27.5 by weight. The latex is coagulated by freezing and the obtained coagulum washed with demineralized water until neutrality of the washing waters. The polymer is then dried at 150° C.

To transform the —SO$_2$F groups into —SO$_3$H groups the obtained polymer is in sequence treated for 16 hours at 80° C. in KOH 10%, washed until neutrality, treated for 24 hours with HCl 20% and washed until neutrality. The polymer is titrated with NaOH to determine the ionomer equivalent weight, which results of 880 g/eq.

The membrane having thickness 0.2 mm is obtained as described in Example 2. The subsequent salification steps with LiOH and final washing with water are carried out according to the modalities reported in the same Example 2. The membrane is weighed and kept in deionized water for the use.

Example 12

Swelling by one pass in solvent, drying process of the membrane prepared in Example 11 and determination of the specific conductivity.

Example 1 is repeated except that the contact time in anhydrous PC in the presence of molecular sieves at the temperature of 40° C. is prolonged to 8 hours.

The membrane water content has resulted 280 ppm. The per cent weight increase of the membrane with respect to the dried membrane is 130% and with respect to the initial wet membrane is 90%. The so obtained swollen membrane is malleable and can easily be bent without cracks. The specific conductivity measured at room temperature is $1\times10^{-4}$ S/cm.

Example 13 (Comparative)

Drying process in an anhydrous nitrogen circulation stove at 100° C. for 100 hours according to the prior art, subsequent swolling as in Example 12 of the membrane prepared in Example 11: determination of the specific conductivity.

The membrane is put in an anhydrous nitrogen circulation stove for 100 hours. The so dried specimen is introducrd into a dry box by dipping in anhydrous PC as described in Example 12. The membrane swelling (per cent by weight increase with respect to the weight of the membrane hot dehydrated under vacuum) is 30%. The specific conductivity determined at room temperature is $2\times10^{-5}$ S/cm.

This comparative Example confirms that, by carrying out the drying step according to the prior art, high swelling and specific conductivity values of the membranes are not obtained.

Example 14 (Commparative)

Specific conductivity determination of a swollen membrane in absence of molecular sieves after dehydration at 80° C. for 8 hours.

A rectangle (1 cm×2 cm) of the membrane prepared in Example 2 is put under vacuum at $10^{-3}$ mbar at 80° C. for 8 hours. The specimen is introduced into the dry box. The residual water content has resulted 1,300 ppm. The so dried specimen is swollen in anhydrous PC in absence of molecular sieves, by dipping the specimen in the anhydrous PC for 24 hours.

The membrane swelling, determined as per cent by weight increase with respect to the weight of the dehydrated membrane under vacuum at 80° C. is 167%.

The specific conductivity determined at room temperature on a disk of the swollen membrane having a diameter of 1 cm is $2.10^{-6}$ cm.

The Example shows that in the presence of water it is possible to obtain a membrane swelling comparable with that obtained with the present invention process, but that the conductivity remains very low. Therefore a high swelling is not a sufficient condition to have good conductivity.

Example 15

Anodic stability determination of the membrane prepared in Example 4.

The determination is carried out according to the above described method. The decomposition potential value determined at 40° C. is of 5.2 V.

TABLE 1

Example 8 (comparative) - drying process by heating under vacuum at 110° C. for 64 h and swelling according to Example 3: conditioning times and corresponding increase by weight of the membrane

| Conditioning time (days) | Swelling (% by weight) |
|---|---|
| 2 | 1 |
| 3 | 4 |
| 7 | 13 |
| 8 | 18 |
| 9 | 25 |
| 15 | 27 |

TABLE 2

Example 10 (comparative): drying process by heating in a stove under nitrogen atmosphere and subsequent membrane swelling using propylen carbonate in the presence of molecular sieves: conditioning times, increases by weight of the membrane and specific conductivity

| Conditioning time (days) | Swelling (% by weight) | Specific conductivity (S/cm) |
|---|---|---|
| 2 | 2 | $10^{-8}$ |
| 3 | 5 | $8.10^{-8}$ |
| 7 | 17 | $2.10^{-7}$ |
| 8 | 18 | $1.10^{-6}$ |
| 9 | 23 | $1.10^{-6}$ |
| 15 | 24 | $1.10^{-6}$ |

The invention claimed is:

1. A process to prepare ionomeric membranes formed by (per) fluorinated ionomeric electrolyte polymers salified with a lithium ion, comprising the following steps:

a) obtaining of (per) fluorinated polymer membranes, containing —SO$_2$F groups pendent with respect to the main chain;

b) partial or complete salification of the (per) fluorinated polymer membranes containing —SO$_2$F groups with basic lithium compounds and final water washing; and c) swelling and contemporaneous drying of the membranes by dipping in a heterogeneous biphasic system consisting of:
  (1) a dipolar aprotic organic solvent or a mixture of dipolar aprotic organic solvents, and
  (2) molecular sieves dispersed therein which are inert with respect to the solvent and the membranes;
and wherein any swelling step in the process occurs in the absence of protic solvents.

2. The process according to claim 1, carried out in a discontinuous or continuous way.

3. The process according to claim 1, wherein step c) is optionally repeated when the process is discontinuous.

4. The process according to claim 1, wherein the polymers used to prepare the ionomeric membranes are copolymers of:
  (1) a fluoroolefin containing a fluorosulphonic group, having formula:

$$CF_2=CF-(OCF_2CFR)_aO-CF_2CFR'SO_2F \qquad (I)$$

wherein
  R and R' are independently: F, Cl, or a $C_1$-$C_3$ perfluoroalkyl;
  a is zero or 1; and
  (2) one or more fluorinated olefinic comonomers,
  (3) optionally with non fluorinated olefinic comonomers.

5. The process according to claim 4, wherein the fluoroolefin of formula (I) is a vinylether of formula $CF_2=CFOCF_2CF_2SO_2F$.

6. The process according to claim 4, wherein the fluorinated olefinic comonomers are selected from the group consisting of:
  $C_2$-$C_8$ (per) fluoroolefins;
  $C_2$-$C_8$ hydrogenated fluoroolefins, selected from the group consisting of:
vinyl fluoride (VF), vinylidene fluoride (VDF), trifluoroethylene, hexafluoroisobutene, and a $CH_2=CH-R_f$ perfluoroalkylethylene, wherein $R_f$ is a $C_1$-$C_6$ perfluoroalkyl;
  $C_2$-$C_8$ chloro- and/or bromo- and/or iodo-fluoroolefins;
  $CF_2=CFOR_f$ (per) fluoroalkylvinylethers (PAVE), wherein $R_f$ is a $C_1$-$C_6$ (per) fluoroalkyl; and
  $CF_2=CFOX$ (per) fluoro-oxyalkylvinylethers, wherein X is selected from the group consisting of: $C_1$-$C_{12}$ alkyl, $C_1$-$C_{12}$ oxyalkyl, and $C_1$-$C_{12}$ (per) fluoro-oxyalky having one or more ether groups.

7. The process according to claim 4, wherein the non fluorinated olefinic comonomers are $C_2$-$C_8$ olefins.

8. The process according to claim 4, wherein the polymers used to prepare the ionomeric membranes are copolymers containing a fluoroolefin of formula (I) in an amount in percent by moles, lower than or equal to 50% by moles.

9. The process according to claim 4, wherein the (per) fluorinated polymers of the membranes are tetrafluoroethylene (TFE) copolymers with the sulphonic fluoroolefin of formula (I).

10. The process according to claim 1, wherein the (per) fluorinated polymers of the membranes have an equivalent weight in the range of 380-1,600.

11. The process according to claim 1, wherein in step a) the membranes have a thickness of 0.05-1 millimeter.

12. The process according to claim 1, wherein in step b), the salification step is carried out at temperatures from 50° C. to 100° C., and wherein step b) comprises transforming the polymers in the lithium form (—$SO_3Li$) with aqueous LiOH or alkaline inorganic lithium salts.

13. The process according to claim 12, wherein in step b), the ionomeric polymers forming the membranes are completely salified.

14. The process according to claim 12, wherein in step b), the final washing with water is carried out at temperatures from 20° C. to 80° C. until neutral reaction of the washing waters.

15. The process according to claim 1, wherein step c) is carried out under the following conditions:
  environment having controlled humidity, lower than 5%;
  the solvent used for the swelling/drying process steps is an organic carbonate; and
  the temperature is from 20° C. to 70° C.

16. The process according to claim 15, wherein the duration of step c) of is from 2 to 24 hours, and step c) ends when the swelling, and the residual water amount in the membrane, satisfy the following conditions:
  the membrane swelling, in percent by weight increase with respect to the sample of the non-swollen membrane, treated under vacuum at 130° C. at $10^{-3}$ mbar($10^2$ Pa) for 8 hours, is higher than 150% when the membrane is formed by a perfluorinated ionomer having an equivalent weight of 750, formed by tetrafluoroethylene (TFE) and the comonomer having formula:

$$CF_2=CFOCF_2CF_2SO_2F; \text{ and}$$

the residual water amount, determined by Karl Fischer equipment, is lower than 400 ppm.

17. The process according to claim 6 wherein:
  $C_2$-$C_8$ (per) fluoroolefins are selected from the group consisting of: tetrafluoroethylene (TFE) and hexafluoropropene (HFP);
  $C_2$-$C_8$ chloro- and/or bromo- and/or iodo-fluoroolefins are selected from the group consisting of: chlorotrifluoroethylene (CTFE) and bromotrifluoroethylene;
  $R_f$ in $CF_2=CFOR_f$ is selected from the group consisting of: trifluoromethyl, bromodifluoromethyl and heptafluoropropyl; and
  X in $CF_2=CFOX$ is perfluoro-2-propoxy-propyl.

18. The process according to claim 7, wherein the non fluorinated olefinic comonomers are ethylene or propylene.

19. The process according to claim 8, wherein the polymers used to prepare the ionomeric membranes are copolymers containing a fluoroolefin of formula (I) in an amount in percent by moles lower than or equal to 30%.

20. The process according to claim 10, wherein the (per) fluorinated polymers of the membranes have an equivalent weight in the range of 550-1,200.

21. The process according to claim 11, wherein in step a), the membranes have a thickness of 0.1-0.3 millimeters.

22. The process according to claim 12 wherein in step b), the salification is carried out at temperatures from 70° C. to 90° C. and the lithium salts are lithium carbonate or bicarbonate.

23. The process according to claim 14, wherein in step b), the final washing with water is carried out at temperatures from 20° C. to 50° C.

24. The process according to claim 15, wherein in step c), the humidity is lower than 0.1%; the organic carbonates are selected from the group consisting of ethylene carbonate, propylene carbonate, dimethylcarbonate and mixtures thereof; and the temperature is from 20° C. to 50° C.

25. The process according to claim 24, wherein in step c), the humidity is lower than 0.001%.

26. The process according to claim 16, wherein the duration of step c) is from 4 to 12 hours and step c) ends when the swelling and the residual water amount in the membrane satisfy the following conditions:
  the membrane swelling, in percent by weight increase with respect to the sample of the non-swollen membrane, treated under vacuum at 130° C. at $10^{-3}$ mbar ($10^2$ Pa) for 8 hours, can reach even values of about 210% when the membrane is formed by a perfluorinated ionomer having an equivalent weight of 750, formed by TFE and the comonomer having formula:

$CF_2$=$CFOCF_2CF_2SO_2F$; and the residual water amount, determined by Karl Fischer equipment, is from about 30 ppm to about 300 ppm.

27. The process according to claim 1, wherein the molecular sieves having 3 Å sizes.